(12) United States Patent
Brule et al.

(10) Patent No.: US 11,781,012 B2
(45) Date of Patent: Oct. 10, 2023

(54) USE OF A SEMI-AROMATIC POLYAMIDE IN A MIXTURE OF ALIPHATIC POLYAMIDE COMPRISING CIRCULAR-SECTION GLASS FIBRES TO LIMIT WARPING

(71) Applicant: ARKEMA FRANCE, Colombes (FR)

(72) Inventors: Benoît Brule, Beaumont-le-Roger (FR); Antoine Breuil, Tokyo-to (JP); Hao Wang, Jiangsu (CN); Xiong Yao, Jiangsu (CN)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/342,359

(22) PCT Filed: Oct. 18, 2017

(86) PCT No.: PCT/FR2017/052866
§ 371 (c)(1),
(2) Date: Apr. 16, 2019

(87) PCT Pub. No.: WO2018/073536
PCT Pub. Date: Apr. 26, 2018

(65) Prior Publication Data
US 2019/0241738 A1 Aug. 8, 2019

(30) Foreign Application Priority Data

Oct. 19, 2016 (FR) ........................ 1660125
Mar. 23, 2017 (FR) ........................ 1752406

(51) Int. Cl.
*C08L 77/06* (2006.01)
*C08K 7/14* (2006.01)
*C08L 77/02* (2006.01)

(52) U.S. Cl.
CPC ............... *C08L 77/06* (2013.01); *C08K 7/14* (2013.01); *C08L 77/02* (2013.01); *C08L 2203/20* (2013.01); *C08L 2205/025* (2013.01)

(58) Field of Classification Search
CPC ..... C08L 77/06; C08L 77/02; C08L 2205/025
See application file for complete search history.

(56) References Cited

U.S. PATENT DOCUMENTS

| 4,822,846 | A | 4/1989 | Nomura et al. |
| 2010/0279111 | A1 | 11/2010 | Philipp et al. |
| 2011/0105655 | A1 | 5/2011 | Harder et al. |
| 2013/0261256 | A1 | 10/2013 | Ieda et al. |
| 2014/0342145 | A1 | 11/2014 | Oguro et al. |
| 2015/0080516 | A1 | 3/2015 | Kumazawa et al. |
| 2016/0122510 | A1 | 5/2016 | Verfaillie et al. |
| 2016/0130439 | A1 | 5/2016 | Koch et al. |
| 2018/0343055 | A1 | 11/2018 | Olson |

FOREIGN PATENT DOCUMENTS

| CN | 101454132 A | 6/2009 |
| CN | 103987782 A | 8/2014 |
| CN | 104684972 A | 6/2015 |
| CN | 104968708 A | 10/2015 |
| CN | 105308110 A | 2/2016 |
| EP | 1972659 A1 | 9/2008 |
| EP | 2789591 A1 | 10/2014 |
| EP | 2792714 A1 | 10/2014 |
| JP | H05-279567 A | 10/1993 |
| JP | 2010-168559 A | 8/2010 |
| JP | 5523520 B2 | 4/2014 |
| JP | 5526500 B2 | 6/2014 |
| JP | 2016-108547 A | 6/2016 |
| JP | 2010-189467 A | 7/2016 |
| JP | 2019-520729 A | 7/2019 |
| KR | 10 2014 0107445 A | 9/2014 |
| WO | 2013/088932 A1 | 6/2013 |
| WO | 2014195226 A1 | 12/2014 |

OTHER PUBLICATIONS

International Search Report (PCT/ISA/210) dated Feb. 21, 2018, by the European Patent Office as the International Searching Authority for International Application No. PCT/FR2017/052866.
International Search Report (PCT/ISA/210) dated Mar. 7, 2018, by the European Patent Office as the International Searching Authority for International Application No. PCT/FR2017/052867.
Wallenberger, Frederick T., et al., Glass Fibers, ASM International, ASM Handbook, vol. 21: Composites (# 06781G), pp. 27-34, 2001.
Written Opinion (PCT/ISA/237) dated Feb. 21, 2018, by the European Patent Office as the International Searching Authority for International Application No. PCT/FR2017/052866.
Written Opinion (PCT/ISA/237) dated Mar. 7, 2018, by the European Patent Office as the International Searching Authority for International Application No. PCT/FR2017/052867.

(Continued)

*Primary Examiner* — Wenwen Cai
(74) *Attorney, Agent, or Firm* — Boone IP Law

(57) ABSTRACT

The use of at least one MXDZ polyamide, obtained from the polycondensation of meta-xylylenediamine (MXD), with a $C_6$ to $C_{18}$ aliphatic (Z) dicarboxylic acid, in particular $C_6$ to $C_{12}$, in a mixture including at least one aliphatic polyamide A obtained from the polycondensation of a unit selected from: a $C_6$ to $C_{12}$ lactam, a $C_6$ to $C_{12}$ amino acid, and an XY unit obtained from the polycondensation of a $C_4$ to $C_{18}$, aliphatic diamine (X), especially $C_4$ to $C_{12}$, and a $C_6$ to $C_{18}$ aliphatic dicarboxylic acid (Y), especially $C_6$ to $C_{12}$, circular-section glass fibres and optionally at least one impact modifier and/or at least one additive, said at least one MXDZ polyamide and said mixture constituting a composition, and the MXDZ/A weight ratio being from 0.11 to 0.83, in particular from 0.11 to 0.66, to limit the warping of said composition during processing, in particular by injection or compression moulding.

13 Claims, 1 Drawing Sheet

(56) References Cited

OTHER PUBLICATIONS

Office Action (Notice of Grounds for Rejection) dated Dec. 15, 2021, by the Intellectual Property Office in corresponding Korean Patent Application No. 10-2019-7013966, and an English Translation of the Office Action. (10 pages).

Official Action in corresponding Chinese Application No. 201780064413.8, dated May 14, 2021, 9 pages (English translation only).

Office Action (Notice of Reasons for Rejection) dated Oct. 26, 2021, by the Japanese Patent Office in corresponding Japanese Patent Application No. 2019-520729, and an English Translation of the Office Action. (8 pages).

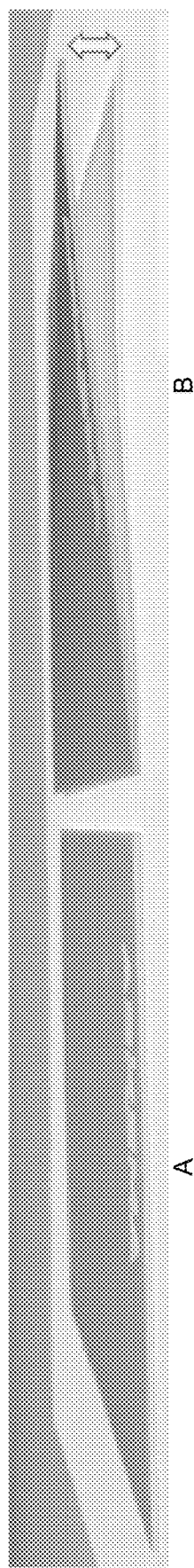

USE OF A SEMI-AROMATIC POLYAMIDE IN A MIXTURE OF ALIPHATIC POLYAMIDE COMPRISING CIRCULAR-SECTION GLASS FIBRES TO LIMIT WARPING

The present invention relates to the use of a semi-aromatic polyamide, in particular an MXDZ polyamide in a mixture of aliphatic polyamide, in particular semi-crystalline polyamide, comprising circular-section glass fibres, to limit the warping of the composition obtained. It also relates to the composition obtained with the semi-aromatic polyamide and the aliphatic polyamide mixture comprising circular-section glass fibres and its use in constituting a monolayer structure or at least one layer of a multilayer structure, especially in the electrical and/or electronics (E/E) field (s).

Many applications in the E/E field require very rigid materials (phone shell, computer part . . . ). Rigidity is even more important as the market trend moves towards a decrease in the weight of electronic equipment and therefore towards a reduction in the thickness of parts.

However, the production of thin parts creates other issues: ability to be injected, especially sufficiently flexible materials to completely fill the mould and in particular, respecting part stability (no warping: major problem with these rigid materials obtained by addition of glass fibres).

In these applications, rigid polyamides (PA) (modulus>12 GPa) play a vital role. But when the fibre content is greater than 30%, the use of non-circular or flat cross-section fibres (FF) is the solution chosen to meet all the specifications, and in particular to stop warping of injected fine parts.

Thus, paragraph [0003] in application EP2789591, indicates that the non-circular cross-section glass fibres make it possible to improve the mechanical properties, dimensional accuracy and warping of resins reinforced with said non-circular-section glass fibres. This is due, according to this application, with regard to the improvement of mechanical properties, to the fact that non-circular-section glass fibres have a greater contact area than circular-section fibres. As regards the improvement of dimensional accuracy and warping, this is due, once more, according to application EP2789591, to the fact that non-circular-section glass fibres are less oriented in the flow direction than circular-section glass fibres and therefore tend to be more bi-dimensionally oriented than circular-section glass fibres in the moulded part.

Similarly, patent application US 2011/0105655 describes compositions having a low distortion rate during moulding and consisting of 25 to 72% by weight of a polyamide, 20 to 65% by weight of flat-section glass fibres with L/D ratio of 2 to 8, and 8 to 25% by weight of a flame retardant (L representing the large dimension of the cross section of the fibre and D the small dimension of the cross section of said fibre). The polyamide used is a mixture of 55-90% by weight of an aliphatic polyamide and 10 to 45% by weight of another polyamide which can be MXD6 based on the total sum of the polyamides.

Patent application US 2010/279111 equally describes compositions also having a low distortion during moulding consisting of 30 to 80% by weight of a polyamide and 20 to 70% of long glass fibres with flat-section L/D ratio of 2 to 8. The polyamide used is either a mixture of 55 to 85% by weight of analiphatic polyamide and from 15 to 45% by weight of a polyamide which may be MXD6 based on the total sum of the polyamides, i.e. a mixture of 55 to 85% by weight of analiphatic polyamide and from 15 to 45% by weight of a co-polyamide comprising one or more polyamides, for example MXDI or MXD6 and at least one other polyamide selected from PA 66, 610, 6 and 12, with respect to the sum total of the polyamides.

Patent number JP5523520 describes polyamide granules having electrical properties and resistance to deformation. The granules consist of 5-40 parts by weight of a flame retardant, 5-200 parts by weight of a flat-section glass fibre with an L/D ratio of at least 2.3 and 0-40 parts by weight of a polyamide which may be a mixture of aliphatic polyamide with a semi-aromatic polyamide such as MXD10.

Nevertheless, the use of flat-section glass fibres compared to circular-section glass fibres generates a significant additional cost. In addition, flat-section glass fibre suppliers are much fewer than circular-section glass fibre suppliers. Both aspects are essential in the context of the industrial production of glass fibre reinforced resins.

It is therefore necessary to be able to have compositions using circular-section glass fibres, thus making it possible to limit the cost of said composition and to ensure a long-lasting supply of circular-section glass fibres while limiting their disadvantages, including in particular warping during the implementation of the compositions.

These various issues have been resolved by a specific alloy of MXDZ with a mixture of aliphatic polyamide and circular-section glass fibres.

The term "alloy" here refers to a mixture.

The inventors have indeed, unexpectedly found that the addition of an MXDZ polyamide in a mixture of aliphatic polyamide, in particular, semi-crystalline, comprising circular-section glass fibres, made it possible to limit the warping of the composition during implementation, in particular by injection or compression moulding of the composition, warping which occurs when the mixture and the glass fibre are implemented without MXDZ polyamide.

Another advantage of the MXDZ compositions in a mixture of aliphatic polyamide and circular-section glass fibres is to present mechanical properties, in particular of greater elongation at break, especially of 30%, with respect to a composition with flat-section glass fibres.

The present invention therefore relates to the use of at least one MXDZ polyamide, obtained from the poly-condensation of meta-xylylenediamine (MXD), with a $C_6$ to $C_{18}$ aliphatic (Z) dicarboxylic acid, in particular $C_6$ to $C_{12}$, in a mixture comprising at least one aliphatic polyamide A obtained from the poly-condensation of a unit selected from:
- a $C_6$ to $C_{12}$ lactam,
- a $C_6$ to $C_{12}$ amino acid, and
- an XY unit obtained from the poly-condensation of a $C_4$ to $C_{18}$ aliphatic diamine (X), especially $C_4$ to $C_{12}$, and a $C_6$ to $C_{18}$ aliphatic dicarboxylic acid (Y), especially $C_6$ to $C_{12}$, circular-section glass fibres and optionally at least one impact modifier and/or at least one additive, said at least one MXDZ polyamide and said mixture constituting a composition, and the MXDZ/A weight ratio being from 0.11 to 0.83, in particular from 0.11 to 0.66, to limit the warping of said composition during processing, in particular by injection or compression moulding.

The term "limited warping" means the warping is less than 2 mm, in particular less than 1 mm as determined on plates of $100*100*1$ $mm^3$.

Warping can be totally removed, but as a rule, it is less than 2 mm, especially less than 1 mm.

Meta-xylylenediamine (MXD, CAS No. 1477-55-0) may be used alone or in combination with para-xylylene diamine (PXD, CAS No. 539-48-0), but in the latter case, and in the whole description, there must be a higher quantity of MXD than PXD.

Advantageously, MXD is used alone and the composition is therefore devoid of PXD. $C_6$ to $C_{18}$ aliphatic dicarboxylic acid (Z) may be selected from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, aliphatic dicarboxylic acid (Z) is $C_7$ to $C_{18}$ and may be selected from suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Aliphatic dicarboxylic acid (Z) is not a mixture of the above-defined $C_6$ to $C_{18}$, or $C_7$ to $C_{18}$ aliphatic dicarboxylic acids, and MXDZ therefore corresponds to a homopolyamide. However, MXDZ can be a mixture of MXDZ.

In the event where MXD is mixed with PXD, then MXDZ corresponds to a MXDZ/PXDZ copolyamide provided that the MXDZ molar ratio in the copolyamide is greater than that of PXDZ.

Advantageously, the MXD is devoid of PXD and MXDZ is a homopolyamide.

Advantageously, $C_6$ to $C_{12}$ aliphatic dicarboxylic acid (Z) may be selected from adipic acid, suberic acid, azelaic acid, sebacic acid, undecanedioic acid or dodecanedioic acid.

More advantageously, the $C_7$ to $C_{12}$ aliphatic dicarboxylic acid (Z) may be selected from suberic acid, azelaic acid, sebacic acid, undecanedioic acid or dodecanedioic acid.

The term "aliphatic polyamide" refers to a homopolyamide, with the exception of a copolyamide. It is understood that it may be a mixture of aliphatic polyamides. Aliphatic polyamide A is therefore, a homopolyamide.

The nomenclature used to define polyamides is described in ISO 1874-1:2011 "Plastics—Polyamide (PA) Materials for Moulding and Extrusion—Part 1: Designation", especially on page 3 (Tables 1 and 2) and is well known to the person skilled in the art.

When aliphatic polyamide A is obtained from the polycondensation of a lactam, said lactam may be selected from pyrrolidinone, 2-piperidinone, caprolactam, enantholactam, caprylolactam, pelargolactam, decanolactam, undecanolactam, and lauryl lactam, especially lauryl lactam.

When aliphatic polyamide A is obtained from the polycondensation of an amino acid, it may be selected from 9-aminononanoic acid, 10-aminodecanoic acid, 10-aminoundecanoic acid, 12-aminododecanoic acid and 11-aminoundecanoic acid and its derivatives, especially N-heptyl-11-aminoundecanoic acid, in particular 11-aminoundecanoic acid.

When aliphatic polyamide A is obtained from the polycondensation of an XY unit, the $C_4$ to $C_{18}$ diamine (X) used in the XY polyamide is a linear or branched diamine, and may in particular be selected from 1,4-butanediamine, 1,5-pentamethyldiamine, 2-methyl-1,5-pentanediamine, 1,6-hexamethylenediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

Advantageously, the diamine (X) used is $C_4$ to $C_{12}$, in particular selected from 1,4-butanediamine, 1,5-pentamethyldiamine, 2-methyl-1,5-pentanediamine, 1,6-hexamethylenediamine, 1,7-heptanediamine and 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine.

Advantageously, the diamine (X) used is $C_6$ to $C_{10}$, in particular selected from 2-methyl-1,5-pentanediamine, 1,6-hexamethylenediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine.

When aliphatic polyamide A is obtained from the polycondensation of an XY unit (also called XY polyamide), the $C_6$ to $C_{18}$, in particular $C_6$ to $C_{12}$, aliphatic (Y) dicarboxylic acid used is as defined above.

For the purposes of the invention, glass fibre refers to any glass fibre, especially as described by Frederick T. Wallenberger, James C. Watson and Hong Li, PPG Industries Inc. (ASM Handbook, Vol 21: composites (#06781G), 2001 ASM International), provided said fibre is circular-section.

Advantageously, said glass fibres have a diameter of 4 μm to below 25 μm, preferably from 4 to 15 μm and an L/D ratio (L representing the large dimension of the transverse section of the fibre and D the small dimension of the transverse section of said fibre) below 2, in particular below 1.5.

Advantageously, the L/D ratio is equal to about 1.

The term "impact modifier" is understood to mean a polyolefin-based polymer having a flexural modulus of less than 100 MPa measured at 23° C. according to ISO 178: 2010 and Tg of less than 0° C. (measured according to US Pat. standard 11357-2 at the inflection point of the DSC thermogram), especially a polyolefin, coupled or not with a Peba (polyether block amide) with a flexural modulus <200 MPa. Using a Peba alone as impact modifier in the composition, would not be outside the scope of the invention.

The impact modifier polyolefin may be functionalised or non-functionalised or a mixture of at least one functionalised and/or at least one non-functionalised.

In particular, some or all of the polyolefins bear a function selected from carboxylic acid, carboxylic anhydride and epoxide functions, and is especially selected from an elastomeric ethylene-propylene rubber copolymer (EPR), an elastomeric ethylene-propylene-diene copolymer (EPDM) and an ethylene/alkyl (meth) acrylate copolymer, a higher ethylene-alkene copolymer, in particular, an ethylene-octene copolymer, an ethylene-alkyl acrylate-maleic anhydride terpolymer.

Advantageously, the impact modifier is selected from F493®, a Pebax®, in particular Pebax® 40R53 SP01, a Lotader®, in particular Lotader® 5500 or Lotader® 7500, Exxelor VA1803®, or a mixture of these. In this case they are in a ratio ranging from 0.1/99.9 to 99.9/0.1, preferably 1/2 to 2/1 when in a mixture of two.

The impact modifier for example, is selected from the following mixtures: F493®/Lotader®, especially F493®/Lotader® 5500 or F493®/Lotader® 7500.

The impact modifier can also be a "core-shell" modifier, also referred to as a "core-shell copolymer".

The "core-shell" type modifier is in the form of fine particles having an elastomer core and at least one thermoplastic shell, the size of the particles is generally below 1 μm and advantageously from 150 to 500 nm.

The "core-shell" type modifier has an acrylic or butadiene base, contrary to the impact modifier which has a polyolefin base.

Advantageously, the proportion of impact modifier is from 0 to 10% by weight with respect to the total weight of the composition.

The use of at least one MXDZ in the mixture comprising an aliphatic polyamide and glass fibres constitutes a composition.

Advantageously, said composition is devoid of flame retardant.

Advantageously, the said composition is devoid of PA66.

Advantageously, said composition is devoid of flame retardant and PA66.

Advantageously, said composition is devoid of PA6 and PA66.

The additives optionally used in the composition obtained with the use of MXDZ in a mixture of aliphatic polyamide A and glass fibres are the conventional additives used in polyamides and well known to those skilled in the art.

The weight ratio MXDZ/A in said composition ranges from 0.11 to 0.83, in particular from 0.11 to 0.66.

As a result, the semi-aromatic polyamide MXDZ is always in a lower proportion than the aliphatic polyamide A or the mixture of aliphatic polyamides A.

Advantageously, aliphatic polyamide A is a semi-crystalline polyamide or a mixture of semi crystalline polyamides.

The expression "semi-crystalline polyamide" within the scope of the invention denotes polyamides having a melting temperature (Tf) and a heat-exchange of $\Delta H > 10$ J/g, in particular $>12$ J/g, as well as a glass transition temperature (Tg) as determined by DSC according to ISO 11357-1: 2009 and ISO 11357-2 and 3: 2013, at a heating rate of 20K/min.

Advantageously, the proportion of said at least one MXDZ polyamide used with said mixture is from 5 to 30% by weight, in particular from 5 to 20% with respect to the sum of the constituents of said composition.

Advantageously, said composition constituted by the use of said at least one MXDZ polyamide with said mixture comprises:
from 5 to 30% by weight, in particular from 5 to 20, of MXDZ
from 20 to 60% by weight, in particular from 25 to 50%, of said at least one aliphatic polyamide A,
from 30 to 75% by weight, in particular from 40 to 65% by weight of circular-section glass fibres,
from 0 to 10% by weight of at least one impact modifier,
from 0 to 2% by weight of at least one additive.

The sum of the proportions of each constituent of the composition being equal to 100%.

Advantageously, said composition constituted above is one of the following (the percentages are indicated by weight):

| COMPOSITION N° | MXDZ | Aliphatic polyamide A | Glass fibres |
| --- | --- | --- | --- |
| 1 | 5-30% | 20-60% | 30-75% |
| 2 | 5-30% | 20-60% | 40-65% |
| 3 | 5-30% | 25-50% | 30-75% |
| 4 | 5-30% | 25-50% | 40-65% |
| 5 | 5-20% | 20-60% | 30-75% |
| 6 | 5-20% | 20-60% | 40-65% |
| 7 | 5-20% | 25-50% | 30-75% |
| 8 | 5-20% | 25-50% | 40-65% |

The sum of the constituents of each composition 1 to 8 is equal to 100%.

Each of the above compositions 1 to 8 may further comprise at least one impact modifier up to 10% by weight, the sum of the constituents being equal to 100%.

Each of the above compositions 1 to 8 may further comprise one additive up to 2% by weight, the sum of the constituents being equal to 100%.

Each of the compositions 1 to 8 above may further comprise at least one impact modifier up to 10% by weight and at least one additive up to 2% by weight, the sum of the constituents being equal to 100%.

Advantageously, the MXDZ used with said mixture defined above to constitute one of the compositions defined above comprises MXD10.

The MXD10 is therefore in combination with at least one other MXDZ, Z being a $C_6$ to $C_{18}$ C-dicarboxylic acid, especially $C_7$ to $C_{18}$, as defined above, in particular in a proportion greater than 50% by weight with respect to the total sum of MXDZ polyamides.

Advantageously, the MXDZ used with said mixture defined above to constitute one of the above-defined compositions consists of MXD10 and MXD6.

Advantageously, the MXDZ used with said mixture defined above to constitute one of the above-defined compositions consists of MXD10.

Advantageously, the aliphatic polyamide A comprises an aliphatic polyamide obtained from the polycondensation of an XY unit wherein the dicarboxylic acid (Y) is sebacic acid.

Advantageously, said aliphatic polyamide A obtained from the poly-condensation of an XY unit the dicarboxylic acid (Y) of which is sebacic acid is in a proportion greater than 50% by weight with respect to the total weight of the aliphatic polyamides A.

Advantageously, said aliphatic polyamide A obtained from the poly-condensation of an XY unit corresponds to a single polyamide the dicarboxylic acid (Y) of which is sebacic acid.

Advantageously, aliphatic polyamide A comprises an aliphatic polyamide obtained from the polycondensation of an XY unit the diamine (X) of which ranges from $C_6$ to $C_{10}$.

The aliphatic polyamide A is therefore a mixture of at least two XY polyamides the diamine (X) of which ranges from $C_6$ to $C_{10}$ the diamines being mostly different from each other.

Advantageously, said aliphatic polyamide A obtained from the polycondensation of an XY unit the diamine (X) of which ranges from $C_6$ to $C_{10}$ is in a proportion greater than 50% by weight with respect to the total weight of XY polyamides.

Advantageously, said aliphatic polyamide A obtained from the polycondensation of an XY unit consists of an XY polyamide the diamine (X) of which is from $C_6$ to $C_{10}$.

In particular, diamine (X) is selected from hexamethylenediamine and decanediamine. Advantageously, said at least MXDZ consists of 0% to 49% weight of MXD6 and 51 to 100% by weight of MXD10 and said aliphatic polyamide A obtained from the poly-condensation of an XY unit consists of 0 to 49% by weight of PA610 and 51 to 100% by weight of PA1010.

Advantageously, MXDZ consists of MXD10 and said aliphatic polyamide A obtained from the poly-condensation of an XY unit consists of 0 to 49% by weight of PA610 and 51 to 100% by weight of PA1010.

Advantageously, MXDZ consists of MXD10 and said aliphatic polyamide A obtained from the polycondensation of an XY unit consists of PA1010.

Advantageously, said at least MXDZ consists of 0% to 49% by weight of MXD6 and 51 to 100% by weight of MXD10 and said aliphatic polyamide A obtained from the polycondensation of an XY unit consists of 0 to 49% by weight of PA1010 and 51 to 100% by weight of PA610.

Advantageously, MXDZ consists of MXD10 and said aliphatic polyamide A obtained from the polycondensation of an XY unit consists of 0 to 49% by weight of PA1010 and 51 to 100% by weight of PA610.

Advantageously, MXDZ consists of MXD10 and said aliphatic polyamide A obtained from the polycondensation of an XY unit consists of PA610.

Advantageously, said aliphatic polyamide A is obtained from the polycondensation of a lactam or an amino acid, especially lauryl lactam or 11-aminoundecanoic acid.

Advantageously, MXDZ consists of MXD10 and said aliphatic polyamide A is obtained from the polycondensation of lauryl lactam.

Advantageously, MXDZ consists of MXD10 and said aliphatic polyamide A is obtained from the polycondensation of 11-aminoundecanoic acid.

In an advantageous embodiment, said at least one additive of said composition constituted by the use of said at least one MXDZ polyamide with said mixture is selected from fillers, dyes, stabilizers, plasticizers, surfactants, nucleating agents, pigments, brighteners, antioxidants, lubricants, flame retardants, natural waxes and mixtures thereof.

In an advantageous embodiment, said at least one additive of said composition constituted by the use of said at least one MXDZ polyamide with said mixture is selected from fillers, dyes, stabilizers, plasticizers, surfactants, nucleating agents, pigments, brighteners, antioxidants, lubricants, natural waxes and mixtures thereof.

In an advantageous embodiment, said composition constituted by the use of said at least one MXDZ polyamide with said mixture comprises:
- from 5 to 30% by weight, especially from 5 to 20% by weight, of an MXD10 polyamide obtained from the polycondensation of meta-xylylenediamine (MXD) or a mixture of meta-xylylene diamine and of para-xylylene diamine, with sebacic acid,
- from 20 to 60% by weight, especially from 25 to 50% of PA1010 obtained from the polycondensation of decanediamine and sebacic acid,
- from 30 to 75% by weight, in particular from 40 to 65% by weight of circular-section glass fibres,
- from 0 to 10% by weight of at least one impact modifier,
- from 0 to 2% by weight of at least one additive.

In an advantageous embodiment, said composition constituted by the use of said at least one MXDZ polyamide with said mixture comprises:
- from 5 to 30% by weight, especially from 5 to 20% by weight, of an MXD10 polyamide obtained from the polycondensation of meta-xylylenediamine (MXD) or a mixture of meta-xylylene diamine and of para-xylylene diamine, with sebacic acid,
- from 20 to 60% by weight, especially from 25 to 50% of PA610 obtained from the polycondensation of hexamethylenediamine and sebacic acid,
- from 30 to 75% by weight, in particular from 40 to 65% by weight of circular-section glass fibres,
- from 0 to 10% by weight of at least one impact modifier,
- from 0 to 2% by weight of at least one additive.

Advantageously, the MXDZ of the above-defined compositions 1 to 8 is MXD10 and aliphatic polyamide A is PA1010.

Advantageously, the MXDZ of the above-defined compositions 1 to 8 is MXD10 and aliphatic polyamide A is PA610.

Advantageously, the MXDZ of the above-defined compositions 1 to 8 is MXD10 and aliphatic polyamide A is PA1012.

Advantageously, the MXDZ of the above-defined compositions 1 to 8 is MXD10 and aliphatic polyamide A is PA12.

Advantageously, the MXDZ of the above-defined compositions 1 to 8 is MXD10 and aliphatic polyamide A is PA11.

According to another aspect, the present invention relates to a composition for an implementation, in particular by injection or compression moulding as defined above, comprising:
- from 5 to 30% by weight, in particular from 5 to 20% by weight, of at least one MXDZ polyamide, obtained from the polycondensation of meta-xylylenediamine (MXD) or a mixture of meta-xylylenediamine and para-xylylene diamine, with a diacid (Z) from $C_6$ to $C_{18}$, especially from $C_7$ to $C_{18}$ especially from $C_6$ to $C_{12}$, more in particular from $C_7$ to $C_{12}$.
- from 20 to 60% by weight, in particular from 25 to 50% by weight of at least one aliphatic polyamide A obtained from the polycondensation of a unit selected from a $C_6$ to $C_{12}$ lactam, a $C_6$ to $C_{12}$ amino acid and an XY unit obtained from the polycondensation of a $C_4$ to $C_{18}$, especially $C_4$ to $C_{12}$, aliphatic diamine (X) and a $C_6$ to $C_{18}$, in particular $C_6$ to $C_{12}$ aliphatic (Y) dicarboxylic acid,
- from 30 to 75% by weight, in particular from 40 to 65% by weight of circular-section glass fibres,
- from 0 to 10% by weight of at least one impact modifier,
- from 0 to 2% by weight of at least one additive.

The sum of the proportions of each constituent of the composition being equal to 100%.

All the technical features and embodiments described above for the use of at least one MXDZ in a mixture comprising at least one aliphatic polyamide A to constitute a composition are valid for the composition as such.

Advantageously, said at least one MXDZ polyamide of said composition defined above comprises MXD10.

Advantageously, said MXDZ polyamide of said composition defined above consists of MXD10.

Advantageously, said dicarboxylic acid (Y) of said aliphatic polyamide A obtained from the polycondensation of an XY unit corresponds to sebacic acid.

Advantageously, said diamine (X) of said aliphatic polyamide A obtained from the polycondensation of an XY unit corresponds to a $C_6$ to $C_{10}$ diamine in particular (X) is selected from hexamethylenediamine and decanediamine.

Advantageously, said aliphatic polyamide A obtained from the polycondensation of a unit selected from a $C_6$ to $C_{12}$ lactam is lauryl lactam.

Advantageously, said aliphatic polyamide A obtained from the polycondensation of a unit selected from a $C_6$ to $C_{12}$ amino acid is aminoundecanoic acid.

Advantageously, the additive of said composition defined above is selected from fillers, dyes, stabilizers, plasticizers, surfactants, nucleating agents, pigments, brighteners, antioxidants, lubricants, flame retardants, natural waxes and mixtures thereof.

Advantageously, said additive of said above-defined composition is selected from fillers, dyes, stabilizers, plasticizers, surfactants, nucleating agents, pigments, brighteners, antioxidants, lubricants, natural waxes and mixtures thereof.

According to another aspect, the present invention relates to the use of a composition defined above to constitute a monolayer structure or at least one layer of a multilayer structure.

Advantageously, said structure is in the form of an injected part.

According to another aspect, the present invention relates to an object obtained from a composition defined above.

According to another aspect, the present invention relates to a method of forming an object as defined above, characterized in that it comprises a compression moulding step.

According to another aspect, the present invention relates to the use of an object, as defined above, in the electrical and/or electronics field.

DESCRIPTION OF FIGURES

FIGS. 1 (A and B) shows warping obtained with 2 (100×100×1 mm$^3$) injected plates by:
A composition I1 or I2 of the invention,
B composition C1 or C4,
and measured as described in example 1.
A: injected plate I1 or I2 the warping of which is limited and below 1 mm,
B: injected plate C1 or C4 the warping of which is very high and above 5 mm.

EXAMPLES

Example 1: Evaluation of the Warping of Polyamide Compositions Based on PA610 or PA1010, MXD10 and Circular or Flat-Section Glass Fibres Synthesis PA610, PA1010 and MXD10 were prepared separately and respectively by polycondensation of hexamethylenediamine and sebacic acid, of decanediamine and of sebacic acid and of meta-xylylenediamine and of sebacic acid according to techniques well known by the person skilled in the art.

Compounding

The compositions were prepared by melt blending of the polymer granules. The mixture was performed by compounding on a co-rotating bi-screw extruder type MC26 with a flat T profile at 270° C. The screw speed was 250 rpm.

The introduction of circular-section or flat-section glass fibres is performed by lateral force-feeding.

Injection

100*100*1 mm$^3$ plates were prepared by injection of the various compositions:

Injection temperature (feed/nozzle): 250/270° C. and 270/300° C.

Mould temperature: 65° C. and 90° C. and 100° C.

Time-at-temperature: 10 seconds

Cooling time: 20 and 30 seconds and the warping was evaluated according to the method described below:

The injected plates are placed on a table. The operator presses on 3 angles of the plate in order to raise the fourth. The gap from the surface of the table and the sample is then measured, see the arrow in FIG. 1. On the left sample in FIG. 1 (A), the warping is limited, meaning it is less than 1 mm.

The results are shown in Table 1 below:

TABLE 1

| Composition | MXDZ (weight %) | PAXY (weight %) | Circular-section glass fibres (% by weight) Nittobo CSX3J451S0 | Flat-section glass fibres (% by weight) Nittobo CSG3PA820S | Warping |
|---|---|---|---|---|---|
| C1 | — | PA610 50% | 50% | — | Very great > 5 mm* |
| C2 | — | PA610 50% | — | 50% | <1 mm |
| I1 | MXD10 (15%) | PA610 35% | 50% | — | <1 mm |
| C4 | — | PA1010 45% | 55% | — | Very great > 5 mm* |
| C5 | — | PA1010 45% | — | 55% | <1 mm |
| I2 | MXD10 15% | PA1010 30% | 55% | — | <1 mm |

*Warping is very great regardless of injection conditions (different T, different mould T, cooling temperature, . . . )
C: Comparative composition
I: Composition of the invention Table 1 illustrates that the introduction of circular-section glass fibres in an aliphatic XY polyamide induces significant warping which is practically eliminated by the introduction of MXDZ, even for a proportion as high as 50% or 55% by weight of circular-section glass.

The same performances are therefore obtained in terms of warping with the compositions of the invention compared to compositions with flat fibres.

Example 2: Mechanical Properties

The elongation at break of compositions C2, C3 and I1 was determined according to the ISO 527 standard.

The mechanical machine is an INSTRON 5966. The crosshead speed is 1 mm/min. The test conditions are 23° C., 50% RH. ISO 527 1A geometry samples were conditioned beforehand for 2 weeks at 23° C., 50% RH. Deformation is measured by a contact extensometer.

Composition C3 corresponds to PA610 (35% by weight), flat-section glass fibres (Nittobo CSG3PA820S, 50% by weight) and MXD10 (15% by weight).

The results are shown in table 2 (five-sample test):

TABLE 2

| | Elongation at break | |
| Composition | % | standard deviation |
|---|---|---|
| C2 | 2.7 | 0.08 |
| C3 | 2.6 | 0.07 |
| I1 | 3.6 | 0.09 |

Table 2 indicates that the composition of the invention has an elongation at break percentage increased by 30% compared to the same composition with flat-section glass fibres instead of circular-section glass fibres or a composition consisting of PA610 and flat-section glass fibres.

The invention claimed is:

1. A composition configured to reduce limit warping upon transformation into an object, the composition comprising:
from 5 to 30% by weight of at least one MXDZ polyamide, obtained from the polycondensation of meta-xylylenediamine (MXD) with a diacid (Z) selected from the group consisting of suberic acid, azelaic acid, sebacic acid, undecanedioic acid, dodecanedioic acid, brassylic acid, tetradecanedioic acid, pentadecanedioic acid and hexandecanedioic acid;

from 20 to 60% by weight of at least one aliphatic polyamide A selected from the group consisting of PA 1010, PA 610, PA 1012, PA 11 and PA 12, from 30 to 75% by weight of circular-section glass fibres, from 0 to 10% by weight of at least one impact modifier, from 0 to 2% by weight of at least one additive, wherein said composition does not contain PA 66, the sum of the proportions of each constituent of the composition being equal to 100%, and wherein the composition produces a warping that is less than 2 mm, as determined on plates of 100*100*1 mm$^3$.

2. The composition according to claim 1, wherein the at least one MXDZ polyamide comprises MXD10.

3. The composition according to claim 1, wherein the at least one MXDZ polyamide consists of MXD10.

4. The composition according to claim 1, wherein the at least one aliphatic polyamide A is PA1010 or PA 610.

5. The composition according to claim 1, wherein the at least one aliphatic polyamide A is PA1010, PA 610 or PA 1012.

6. The composition according to claim 1, wherein said at least one additive is selected from the group consisting of fillers, dyes, stabilizers, plasticizers, surfactants, nucleating agents, pigments, brighteners, antioxidants, lubricants, flame retardants, natural waxes and mixtures thereof.

7. The composition according to claim 1, wherein the composition produces a warping that is less than 1 mm, as determined on plates of 100*100*1 mm$^3$.

8. The composition according to claim 1, wherein the composition comprises from 25 to 50% by weight of at least one aliphatic polyamide A.

9. A layer formed from the composition according to claim 1, wherein the layer is a monolayer structure or at least one layer of a multilayer structure.

10. The layer according to claim 9, wherein the structure is in the form of an injected part.

11. An object obtained from a composition according to claim 1.

12. The object according to claim 11, wherein the object is in the electrical and/or electronics field.

13. A method of forming the object according to claim 11, wherein the method comprises a compression moulding step.

* * * * *